INVENTORS
ALLAN S. HUMPHERYS
JAMES A. BONDURANT

INVENTORS
ALLAN S. HUMPHERYS
JAMES A. BONDURANT

BY R. Hoffman
ATTORNEY

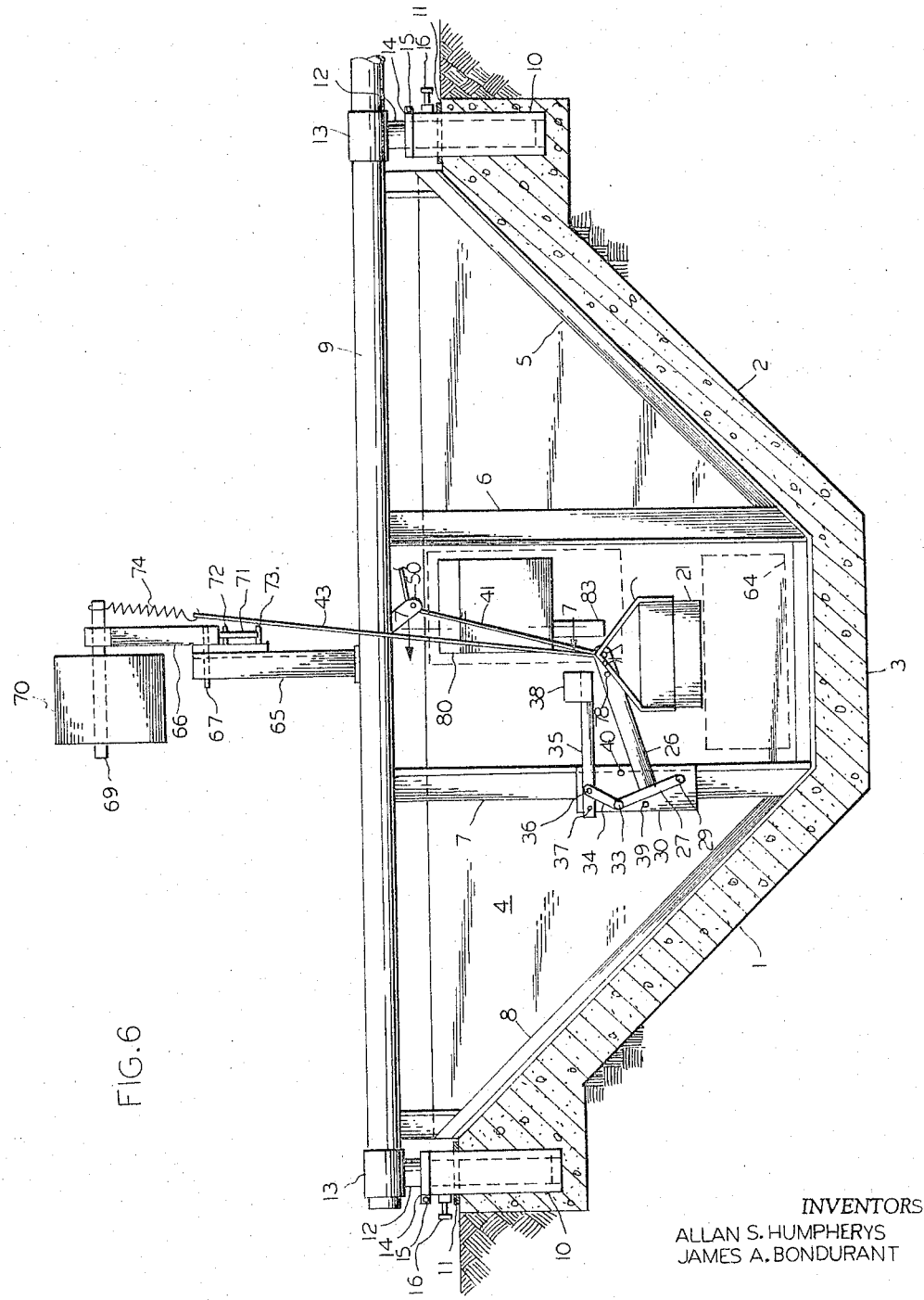

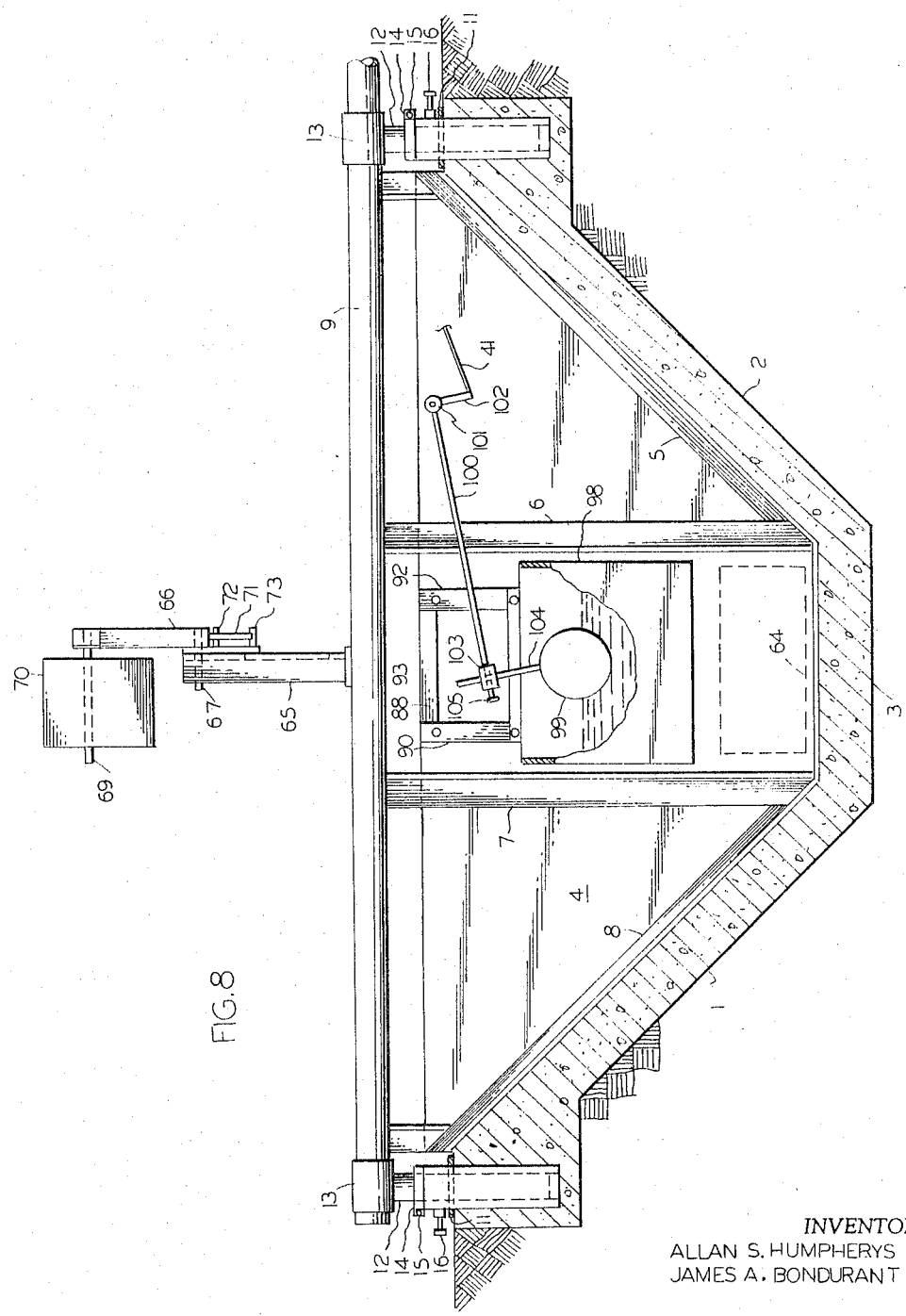

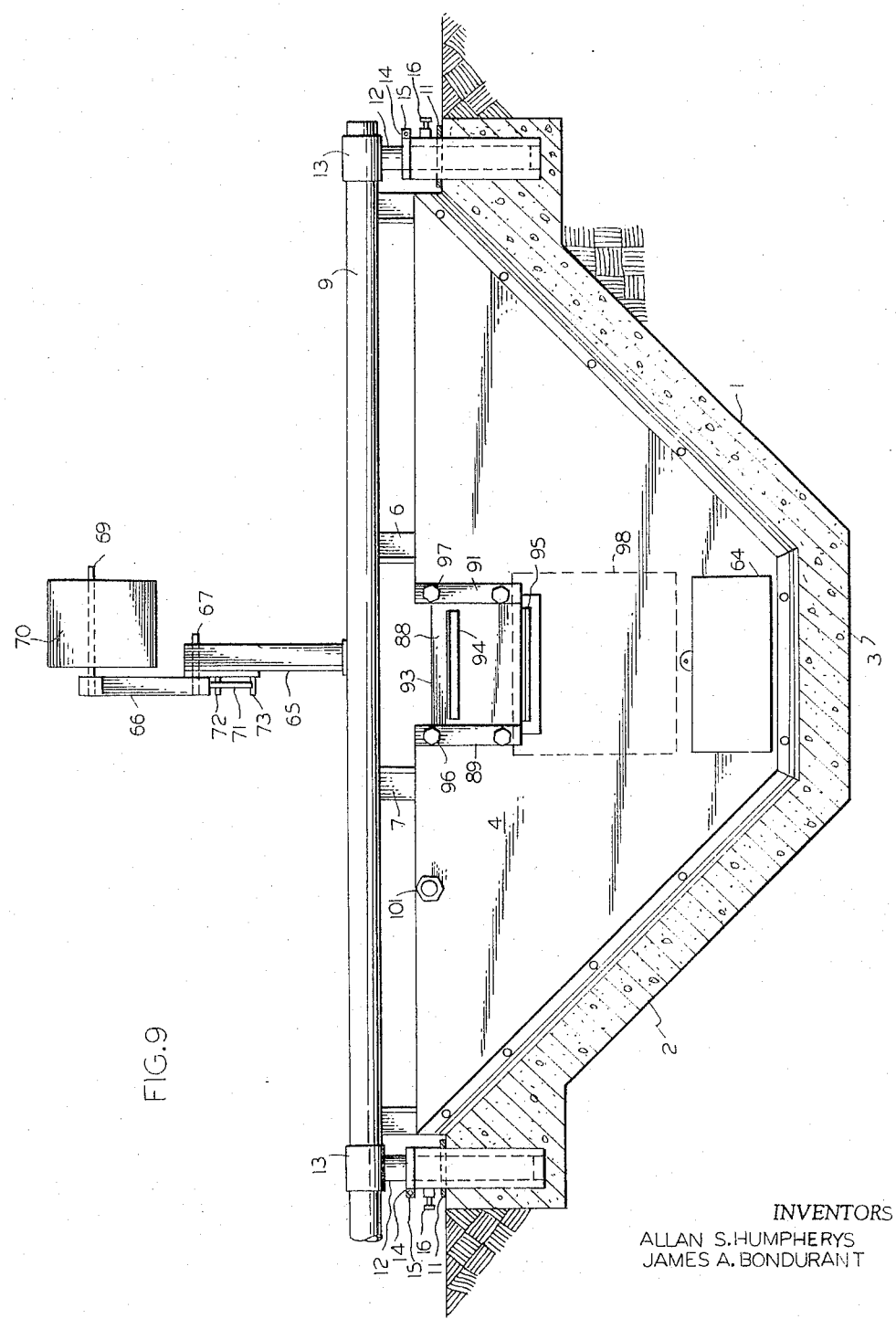

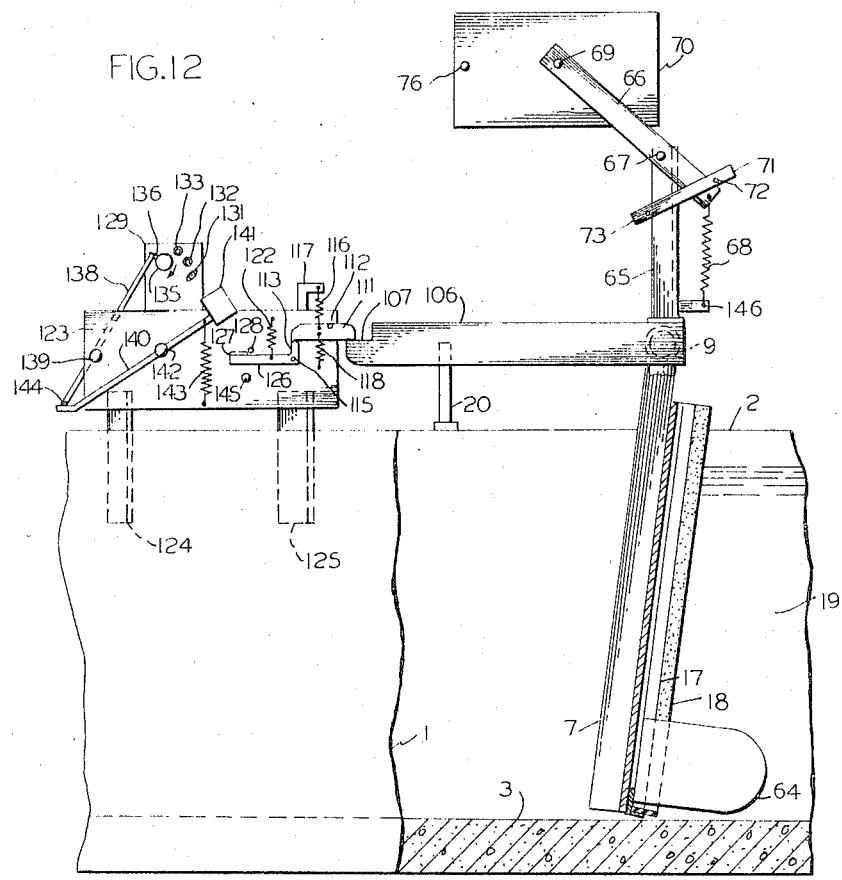
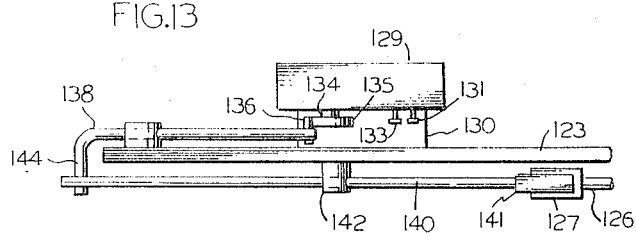

United States Patent Office 3,300,985
Patented Jan. 31, 1967

3,300,985
AUTOMATIC IRRIGATION GATE
Allan S. Humpherys and James A. Bondurant, Boise, Idaho, assignors to the United States of America as represented by the Secretary of Agriculture
Original application June 1, 1962, Ser. No. 199,546, now Patent No. 3,217,497, dated Nov. 16, 1965. Divided and this application Feb. 12, 1965, Ser. No. 451,083
4 Claims. (Cl. 61—25)

This application is a division of Serial No. 199,546, filed June 1, 1962, now Patent No. 3,217,497.

A non-exclusive, irrevocable, royalty-free license in the invention herein described, throughout the world for all purposes of the United States Government, with the power to grant sublicenses for such purposes, is hereby granted to the Government of the United States of America.

This invention relates to an automatic irrigation gate. More particularly, it relates to a self-operating mechanical check gate for controlling irrigation in a farm head ditch or lateral.

Much labor is required to irrigate cropland with conventional methods and equipment. The scarcity and high cost of good farm labor generally results in inefficient irrigation with the result that the crops either receive insufficient water or that too much water is used, resulting in a waste of that sometimes rare commodity.

Accordingly, one object of this invention is to provide means for automatically opening a gate in an irrigation ditch. Another object is to provide means for so opening the gate at a predetermined time. Still another object is to provide means for automatically reclosing the gate and resetting the release mechanism when the water has run out of the ditch. These and other objects that will be obvious to those skilled in the art are achieved by means of the invention described below.

In general, the above objects are achieved by providing a swinging gate across an irrigation ditch rotatable about a horizontal axis. A locking mechanism keeps the gate normally closed when not in use until automatically released as described below. When in use, the gate acts as an automatic check or dam to raise the water level in the ditch for distribution to the field through outlets in the ditch bank upstream from the gate. When it is desired to irrigate the field below the dam, the gate release mechanism is automatically actuated and water pressure behind the gate forces it open and permits water to flow down to the next such gate.

In accordance with the invention, several alternate means are provided for operating the release mechanism. In a preferred form, release is achieved by means of a water-clock tripping mechanism. This and other forms are described in detail below and in the accompanying drawings in which:

FIGURE 6 is a front elevation, similar to FIGURE 1, showing a modification including an overflow tank in combination with a water-clock tripping mechanism;

FIGURE 8 is a front elevation of the downstream side of still another modification employing a float to trip the release mechanism of the gate;

FIGURE 9 is a rear elevation of the modification shown in FIGURE 8 showing the changes in the gate structure to adapt it to use with a float-trip mechanism;

FIGURE 12 shows still a further modification using a mechanical clock-controlled latching mechanism; and FIGURE 13 is an enlarged view of a portion of the latch-release mechanism of the modification of FIGURE 12.

Figure 5:
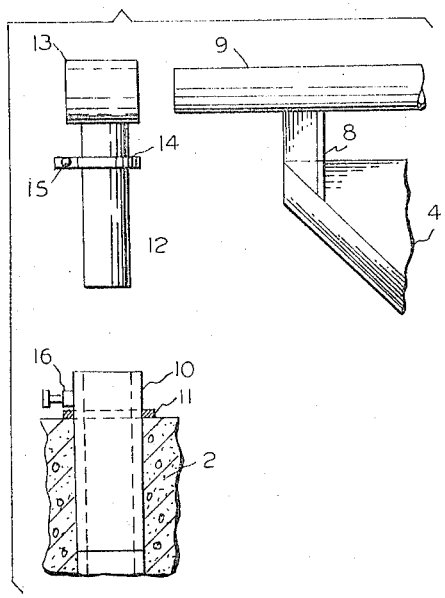
FIGURE 5 is an exploded view on an enlarged scale of one side of the gate showing the means for mounting the latter on the sides of the ditch.
Figure 4:
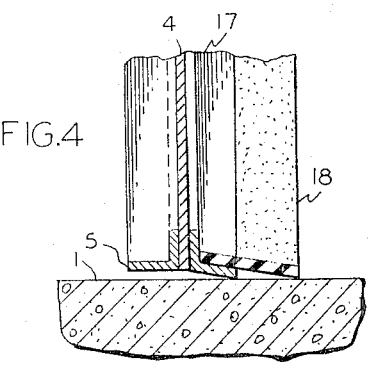
FIGURE 4 is an enlarged section, taken on line 4—4 of FIGURE 1 and shows the means for sealing the edges of the gate to the sides and bottom of the ditch to prevent leakage of water past the gate.

In accordance with a preferred form of the invention, an irrigation ditch having sides 1 and 2 and bottom 3 is provided with a swinging gate 4, that corresponds in shape to the contour of the cross section of the ditch. The gate may be cut of a single sheet of material and reinforced by means of a framework of angle irons 5, 6, 7, and 8. Along the top edge of gate 4 there is secured to the framework, as by welding, a long pipe or rod 9 which serves as the means for suspending or hinging the gate. Pipe 9 is longer than the gate itself and extends over the tops of both sides of the ditch. To mount the gate in a swinging position about the axis of pipe 9, as shown for one side in FIGURE 5, a short length of pipe 10 is set in the concrete at the top of each side of the ditch. A collar 11 is secured to each pipe 10 to maintain a proper height above the ditch. Another length of pipe 12, having an outside diameter small enough to fit inside pipe 10 is provided at its top end with a bearing 13 into which pipe 9 fits for rotation. Pipe 12 is provided with a slidable collar for adjusting the gate to the proper height. Set screw 15 maintains collar 14 at the desired point. Finally, set screw 16 in pipe 10 secures pipe 12 and prevents accidental removal of the latter. It will, of course, be understood that a similar assembly is provided at the other side of the ditch.

Figure 2:
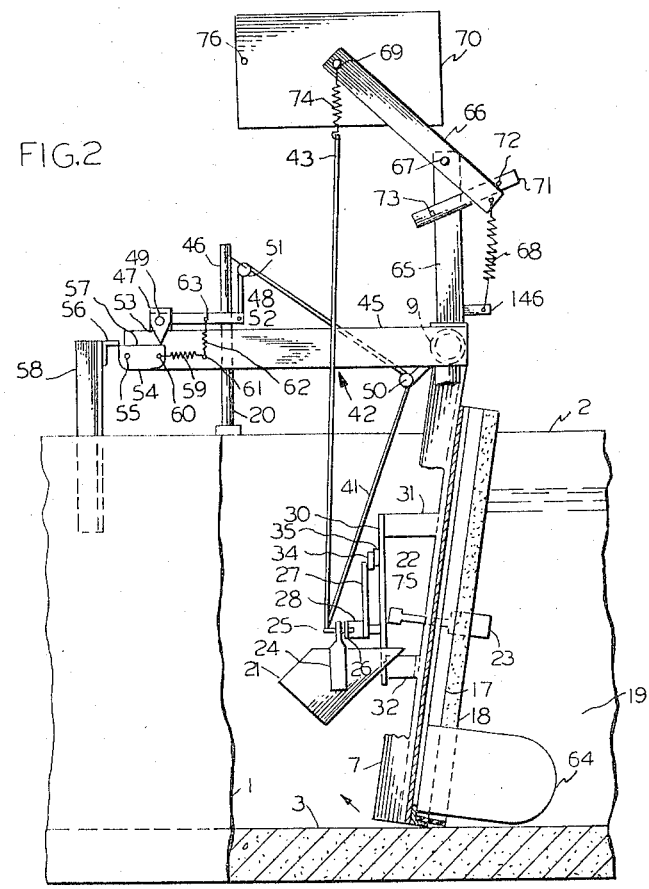
FIGURE 2 is a right side elevation, partly in section, of the gate and ditch shown in FIGURE 1, the section being taken on line 2—2 of FIGURE 1.

To maintain a water-tight seal about the edges of the gate, a sheet metal strip 17 is secured around the periphery of the gate and to it is secured a corresponding length of rubber strip 18. As shown in FIGURE 2, the gate in its closed position is maintained at a slight angle, about 8°, to the vertical to prevent binding of the rubber strip against the sides and bottom of the ditch. However, the pressure of the water 19 on the upstream side of the gate is sufficient to maintain an effective seal to prevent leakage. A foot 20 is provided for the purpose of stopping the gate in the desired position when closing. The location of this member will be explained in greater detail below.

As already indicated, the preferred form of this invention employs a water-clock mechanism to operate the gate.

The water-clock comprises an open top bucket or container 21 suspended from the downstream side of the gate under a regulating valve 22 that protrudes through the gate to the upstream side. This valve is located approximately in the center of the gate so that it is beneath the surface of the water when the ditch behind the gate is full. A screen or filter 23 covers the upstream inlet to the valve to prevent solid objects from becoming lodged therein.

Bucket 21 is provided with a rigidly attached hanger 24 by means of which it is suspended to swing freely from pin 25 at the end of arm 26. The latter is rigidly secured to arm 27 by means of bracket 28. Arm 27 is pivoted at one end on pin 29 secured to plate 30 which is mounted by means of brackets 31 and 32 on member 7 of the gate frame work. The other end of arm 27 is connected through pivot pin 33 to link 34 which in turn, is connected to arm 35 through pivot pin 36. Arm 35 is pivoted at one end on plate 30 by means of pin 37 and is provided with a slidable counterweight 38 at its free end. A pair of pins 39 and 40, secured to plate 30, limit the travel of arm 27, as will be explained in greater detail below.

The water-clock assembly just described is connected by means of cable 41 from pin 25 to the latching assembly, indicated generally as 42, and by means of cable 43 from pin 25 to the overhead counterweight assembly, indicated generally as 44.

The latching mechanism comprises a reaction arm 45 which is secured in any suitable manner, as by welding, to one end of hinge 9 so as to overhang the concrete top of one side of the ditch. In the fully closed position of the gate, arm 45 is substantially horizontal. Some distance in from the free end of arm 45 a bar 46 extending upward is rigidly secured to the arm. A bracket 47 is also rigidly secured to the upper edge of arm 45 at a point between bar 46 and the free end of arm 45 and serves to mount lever 48 by means of pivot pin 49. Lever 48 extends backward toward hinge 9 for a short distance past bar 46. Cable 41 passes over pulley 50, connected to hinge 9, and over pulley 51, connected to bar 46, and is tied to pin 52 at the free end of lever 48. The lever is provided at its pivoted end with an extension 53 which, when the gate is closed, bears perpendicularly on one end of pivoted latch finger 54, having rounded ends as shown in FIGURE 2, which is mounted by means of pivot pin 55 at the end of arm 45. Latch finger 54 extends past the end of arm 45 to engage bracket 56 with its straight upper edge 57. Bracket 56 is mounted at the desired height on an upright member 58 set in the concrete top of the edge of the ditch. A tension spring 59, secured to one end of latch finger 54 by pin 60 and to arm 45 by means of pin 61, tends to maintain the latch finger parallel to arm 45, as seen in FIGURE 2, and to return it to that position after the gate has been opened.

A second tension spring 62, also secured to pin 61, is attached to lever 48 by pin 63 at a point between pivot 49 and cable connection 52. Spring 62 tends to rotate lever 48 in a clockwise direction in the arrangement shown in FIGURE 2 to release the pressure on the end of latch finger 54, but is prevented from doing so by the opposite pull of cable 41. When the water-clock mechanism is tripped, as will be described presently, cable 41 rotates lever 48 in a counterclockwise direction, releasing the pressure of extension 53 on the end of the latch finger. A float 64, mounted at the bottom of the upstream face of the gate, causes the gate and arm 45 to rotate in a clockwise direction. Since latch finger 54 is no longer restrained by extension 53, its pressure against bracket 56 will cause it to pivot in a counterclockwise direction about pin 55, thereby releasing the gate.

To assist in opening and closing the gate, the latter is provided with the counterweight assembly shown generally as 44.

This assembly comprises a support post 65 secured by welding or in any other suitable manner to hinge pipe 9 at the top of the gate. Counterweight support arm 66 is pivotally connected at an intermediate point in its length to the top end of arm 66 by means of pivot pin 67. This intermediate point is selected so that a greater lever arm extends upward from pivot 67 then extends downward. The lower end of arm 66 is connected by means of spring 68 to anchor bracket 146 rigidly secured to the bottom of post 65. The upper end of arm 66 is provided with an axle 69 on which counterweight 70 is mounted to swing freely. A bracket 71, secured to post 65 is provided with stop pins 72 and 73 near its ends to limit the angle through which arm 66 can swing. Finally, cable 43 from the water-clock mechanism is connected to one end of axle 69, as shown in FIGURES 1 and 2, through a spring 74.

Figure 1:
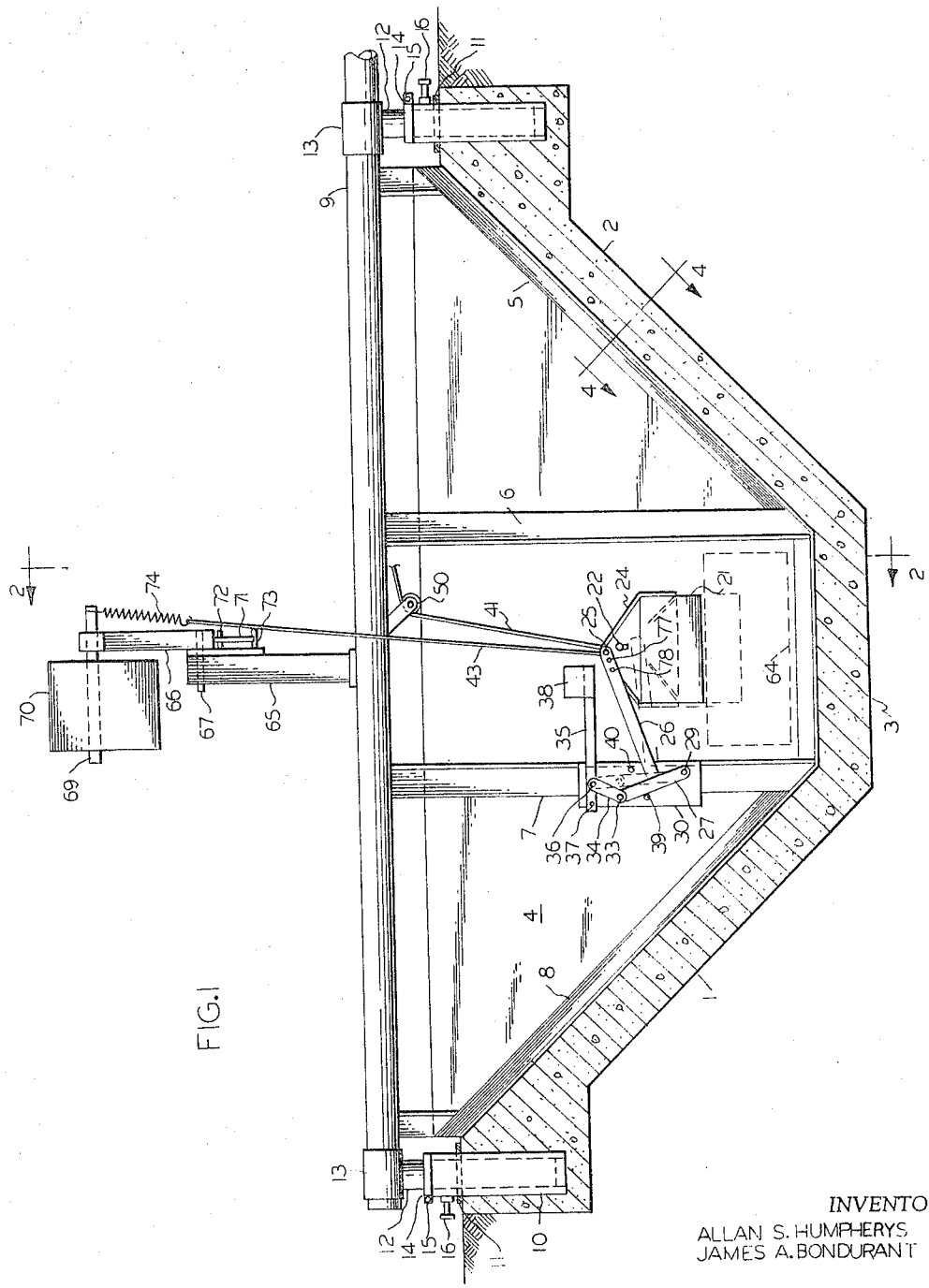
FIGURE 1 is a front elevation, looking upstream, of a preferred form of the gate and mechanism employing a water-clock, shown in the closed position across the ditch.

The gate normally rests in its closed position with the waterclock timing and tripping mechanism in the reset position as shown in FIGURE 1. When the ditch upstream from the closed gate is filled, a small amount of water flows from the upstream side through tube 75 and valve 22 and collects in bucket 21 until its weight is sufficient to offset the weight of counterweight 38 at the end of arm 35. At the moment the weight of the water exceeds the leverage exerted by counterweight 38, it pulls lever 26 downward (clockwise as shown in FIGURE 1) to the position indicated by the dotted lines causing bar 27 also to pivot in a clockwise direction about pin 29. Rotation of bar 27 pushes link 34 upward by the thrust transmitted through pin 33. Link 34 in turn pushes arm 35 upward by means of pin 36, thereby lifting counterweight 38. As the connecting linkages pass "over center," arm 35 and counterweight 38 drop to the tripped position shown dotted.

Figure 3:
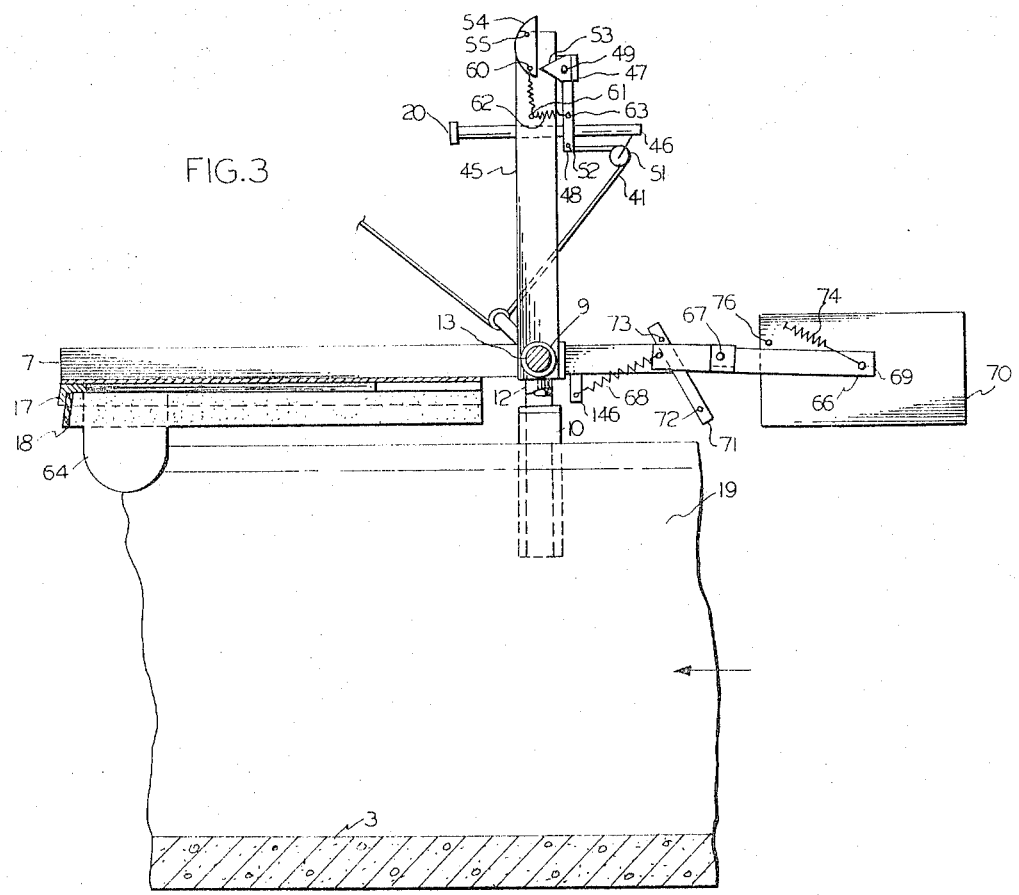
FIGURE 3 is a view similar to that of FIGURE 2, with the tripping mechanism omitted to simplify the figure, showing the gate in the open position.

The impact force of the falling counterweight and the bucket is transmitted through cable 41 to the gate latch, as already described, thereby opening the latter. Although weight 70 overhangs to tend to urge the gate shut, it is not heavy enough to offset the fluid pressure force against the upstream face of the gate. As a result, the fluid pressure force assisted by float 64 causes the gate to rotate clockwise (upward) and assume the horizontal position shown in FIGURE 3, permitting the backed-up water 19 to flow down the ditch. Container 21 is so placed that, as it swings upward with the gate, it tips and is emptied.

Simultaneously, as the gate rotates in a clockwise direction, arm 66 does likewise until it is stopped by pin 73, substantially aligned with post 65. As arm 66 rotates, it exerts a pull on cable 43 which is connected to the tripping mechanism through pin 25, pulling bucket 21 and arm 26 upward, thereby resetting the tripping mechanism.

Counterweight 70 is suspended on axle 69 so that its center of gravity is lower than its point of suspension. Therefore, as arm 66 rotates in a clockwise direction, weight 70 rotates counterclockwise until it is stopped by pin 76 striking edge of arm 66 and assumes the position shown in FIGURE 3.

In the initial closed position of the gate, tension spring 68 is stretched between anchor bracket 146 and the lower end of arm 66. The spring has the least tension when arm 66 is at some point between stop pins 72 and 73. As the lower end of the arm approaches either stop, the spring is stretched and thus acts as a shock absorber to diminish the impact of arm 66 against the stop.

As pointed out above, weight 70 is not so heavy as to completely offset the pressure force of water against the upstream face of the gate. Its weight is also not so great that it will keep the gate permanently open once the position shown in FIGURE 3 has been assumed. As the water runs down the ditch and the level drops, the gate automatically begins to close as the float follows the water surface down. The counterweight leverage diminishes and when the vertical, closed position of the gate is approached, the force acting to cause arm 66 to bear against stop 73 also diminishes to a degree insufficient to resist the pull of spring 68. Arm 66 is thus finally pulled away from stop 73 to some intermediate position. When this occurs, the counterweight 70 passes "over center" and into the original position shown in FIGURE 2. This change in position takes place rapidly and produces a force with a snap action that causes the gate to fully close and engage the latching mechanism previously described. During the change-over from the open to closed position, spring 68 is again stretched, thereby diminishing the shock of arm 66 striking against stop 72.

To prevent the gate from closing too tightly and jamming the seals against the walls of the ditch, a foot 20 is provided on reaction arm 45. This foot is adjustably secured to the arm and extends substantially at right angles downward. It is adjusted to be long enough so that, as the gate approaches the fully closed position, the foot will strike the top of the ditch wall and prevent further closing of the gate beyond the slight angle to the vertical indicated on FIGURE 2. However, the foot should not be so long that it will prevent latch finger 54 from engaging the underside of bracket 56.

The angle between arm 45 and the gate may be fixed permanently during manufacture or it may be made adjustable in the field by any suitable means (not shown). Such means of adjusting the angle will be apparent to one skilled in the art.

As will be apparent from the foregoing description, the counterweight assembly serves a triple purpose, namely, (1) to counterbalance the gate in the open position to permit use of a relatively small float, (2) to assist in closing the gate after irrigation, and (3) to reset the water-clock mechanism.

In the preferred form of the invention described above, the tripping mechanism is actuated when the weight of the water collected in bucket 21 becomes sufficient to counteract the opposing force of weight 38. The time required for this to happen determines the length of the irrigation period and may be varied as any particular instance may require. This is accomplished primarily by varying the rate of water flow into the container by adjusting valve 22.

The amount of water that may be needed for this purpose may also be varied by sliding weight 38 on arm 35. As shown in FIGURE 1, the weight is positioned at the end of arm 35 to require a maximum amount of water in the bucket to open the gate. That is, opening is delayed as long as possible. If earlier opening is desired, it is merely necessary to shift weight 38 to the left to diminish its leverage. The weight of water required to counteract the leverage of the weight will therefore be smaller and the tripping mechanism will operate when less water than previously required has accumulated in bucket 21.

The amount of water needed to trip the mechanism can also be varied by making the position of bucket 21 adjustable along arm 26. Thus, in addition to the extreme position shown in FIGURE 1, the bucket can also be suspended from any one of a series of pins, such as 77 and 78, thereby shortening the lever through which the weight of the water in the bucket acts. In this manner, a greater accumulation of water will be required to open the gate, thereby requiring a longer time where desired.

The above described gate is particularly suitable for use with uncontrolled side outlets along the ditch banks. Thus, the time during which water is backed up behind the gate and is permitted to run off through the outlets along the sides for irrigation is determined by the water-clock tripping mechanism.

Figure 7:
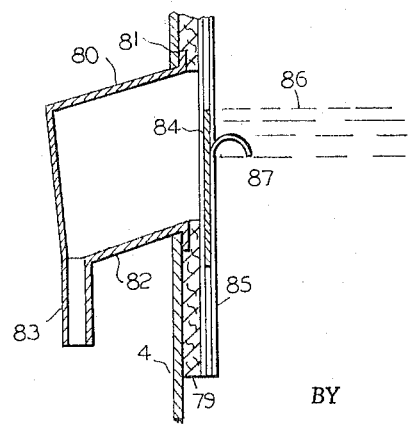
FIGURE 7 is a section, on an enlarged scale, taken on line 7—7 of FIGURE 6, showing the construction and mounting of the overflow tank.

A modification of the above described gate, shown in FIGURES 6 and 7, makes use of an overflow-operated tripping mechanism. This modification can be used with either controlled or uncontrolled side outlets along the ditch banks. When used with uncontrolled outlets the operation would be similar to that already described, except that the overflow trip would serve as a safety feature to open the gate automatically if the backed-up water in the ditch exceeded a safe depth.

To construct this modification, a hole is cut in the face 4 of the gate and a frame of wood or other suitable material 79 is placed about the hole. An overflow trap 80 having an open side commensurate with the frame is fastened in any suitable manner to the frame. The trap may be a sheet metal container having a flange 81 around the periphery of the open side, a sloping bottom 82, and a spout 83 at the lowest point in sloping bottom 82. This trap, in effect a funnel, is set in the hole in the gate with the open side facing upstream and extending through the gate to its downstream side. Spout 83 is located over bucket 21 of the water-clock mechanism already described. In the present modification, valve 22 is closed so that it will not admit any water from the upstream side of the gate. An adjustable slide 84, guided by a rail 85 on each vertical side of the open side of the trap, determines the level 86 at which water begins to pour into the trap. Water spilling over the top of slide 84 enters trap 80 and pours into bucket 21 through spout 83. Operation of the gate tripping mechanism then proceeds as described for the structure of FIGURES 1 and 2. Adjustment of slide 84 may be made by means of finger grip 87. Friction or any mechanical means may be relied on to maintain the slide in the set position in rails 85.

Another modification, employing a float to open the gate is shown in FIGURES 8 and 9. This modification is used with controlled side outlets, as is the previously described overflow-operated gate. As in the latter, opening of the gate is controlled by a predetermined water level on the upstream side.

In accordance with this modification, a vertical section is cut from the top of gate 4 to provide a rectangular opening 88. Four metal strips 89, 90, 91, and 92 are secured along the vertical sides of the cut, as shown in FIGURE 8, to serve as guides for adjustable slide 93. A bracket 94, for operating the slide, is secured to the upstream face of slide 93 and another bracket 95 is placed at the bottom of the cut to act as a stop. Adjustment of the slide at any desired height can be maintained by means of wing nuts 96 and 97.

On the downstream side of the gate, there is mounted an opentop container 98 of sheet metal or other suitable material. The container is so located that its upper edges coincide substantially with the bottom of the cut in the gate. A float 99, carried at the end of lever arm 100, is placed inside container 98. Lever arm 100 is pivotally mounted on the face of the gate by means of pin 101 and a short crank 102 is secured, as by welding, to the pivoted end of the arm 100. Cable 41 of the same latching mechanism shown in FIGURES 1 and 2 is connected to the end of crank 102. The depth to which float 99 falls in container 98 may be adjusted by providing a collar 103 at the end of lever 100 with a hole through which rod 104 on the float can slide. Set screw 105 retains rod 104 in the desired position.

In operation, when the level of water behind the closed gate reaches the top of slide 93 and spills over, container 98 begins to fill, raising float 99. This causes arm 100 and crank 102 to rotate and pull cable 41, releasing the latch, as already described in connection with FIGURES 1 and 2. Counterweight assembly 44 is the same as that shown in the latter figures and functions in the same manner.

As the gate swings open container 98 is emptied in the same way as bucket 21. When the ditch empties float 64 at the bottom of the gate follows the water level down and the gate begins to close. A foot similar to foot 20, limits the travel of the gate to its closed position to prevent binding of the rubber seals. Float 99 resumes its position at the bottom of container 98 and the gate is ready for another cycle. Because the tripping mechanism is float-operated and resets itself by gravity when the gate closes, cable 43 of FIGURES 1 and 2 can be eliminated here.

Figure 10:
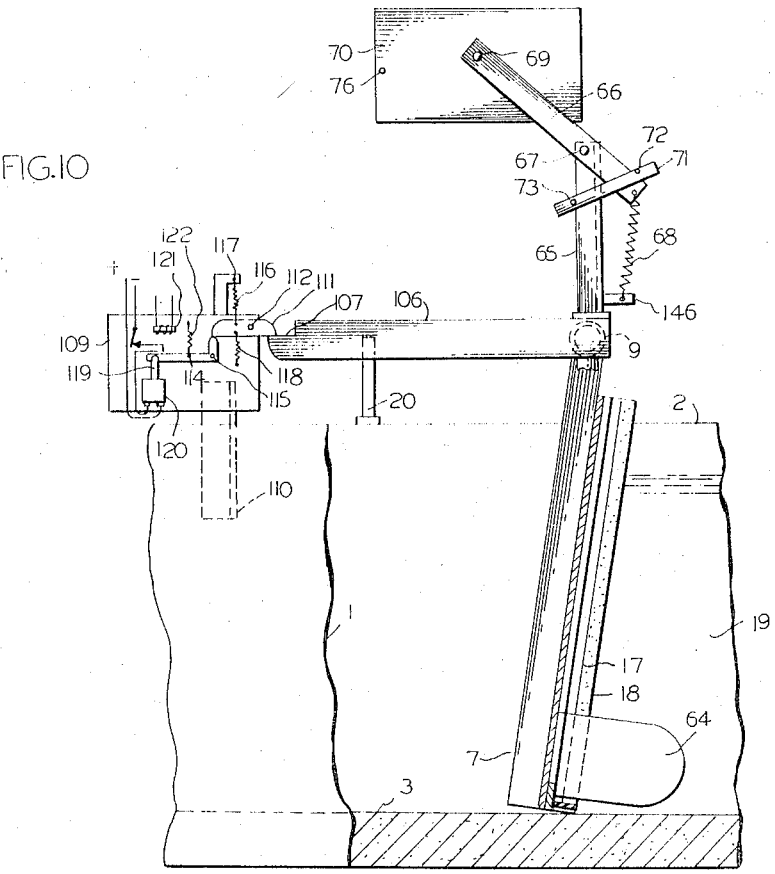
FIGURE 10 shows a further modification using a solenoid control to operate the latch mechanism.

A further modification is shown in FIGURE 10. Here, the latch is operated by means of a solenoid, particularly adapting it to automatic operation.

In using a solenoid to open the latch, the entire tripping mechanism is eliminated from the downstream face of the gate and the reaction arm 45 with its latch mechanism is replaced by a simple arm 106, as shown in FIGURE 10, having a notched or recessed end 107. The latching mechanism, indicated generally by 108 is mounted on a plate 109 secured to post 110 set in the concrete top of the side of the ditch. A latching finger 111, pivotally mounted on plate 109 by pin 112 engages the notched end of reaction arm 106. The latch is maintained closed by means of extension 113 of lever 114 which is pivoted on plate 109 by means of pin 115. Tension spring 116, connected to finger 111 and anchor bracket 117, and oppositely-pulling tension spring 118, connected to finger 111 and plate 109, serve to return the finger to the position shown after the gate has been opened. One end of lever 114 is connected to armature 119 of solenoid 120. Solenoid 120 is connected to a battery or source of alternating current (not shown) through relay 121. As shown in FIGURE 10, the relay is open, maintaining the gate closed. Solenoid 120 is energized when a signal from a source not shown energizes relay 121. Upon receipt of such a signal, armature 119 is drawn into the solenoid as shown by the arrow, causing extension 113 of lever 114 to rotate out of contact with finger 111. An upward force transmitted to reaction arm 106 resulting from the pressure of water against the upstream face of the gate releases the end 107 from the latch and the gate proceeds to open. By means of a contact switch (not shown) opening in the relay circuit when the gate opens, the solenoid can be de-energized. Tension spring 122 connected to lever 114 and plate 109 resets the lever and the latch in their closed positions. When the water has run out of the ditch and the gate swings shut again, the lower rounded end of arm 106 engages the upper rounded end of finger 111 and rotates it downward against the tension in spring 118. As the two ends rotate out of engagement spring 118 returns latch finger to the closed position, locking the gate.

Similarly to the mechanism shown in FIGURES 1 and 2, arm 106 is provided with the foot 20 to limit the rotation of the arm and thus prevent the gate from closing too tightly against the sides of the ditch.

As indicated above, this modification is particularly suited for automatic operation. Thus, for example, the signal to energize relay 121 can come from a soil-moisture sensing device (not shown) that will automatically transmit a signal to the relay when the soil moisture drops below a predetermined level. Alternatively, the signal may come from other irrigation control devices or a manual switch (not shown).

Figure 11:
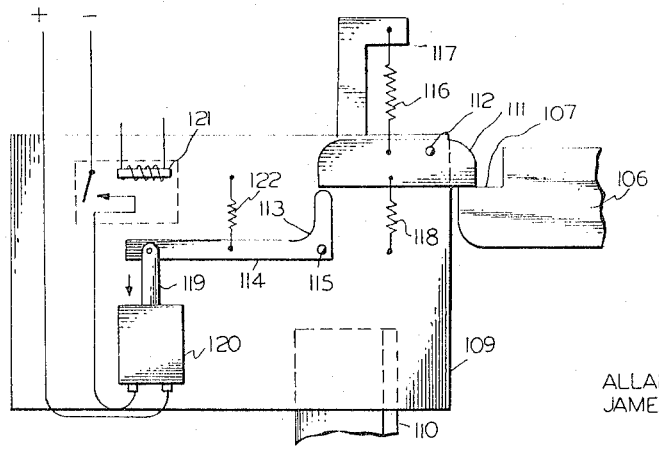
FIGURE 11 is an enlarged view showing the solenoid latch release mechanism in greater detail.

The final modification encompassed within the scope of this invention relates to the mechanical clock- or timer-controlled mechanism shown in FIGURE 11. This is useful particularly in those instances where it is necessary to turn the water at a specific time.

In this modification also, the tripping mechanism of FIGURES 1 and 2 is not needed and is eliminated from the face of the gate. In addition, as in the device of FIGURE 10, reaction arm 45 is replaced by arm 106 provided with foot 20. A stationary plate 123, mounted on supports 124 and 125 sunk in the concrete top of the side of the ditch, carries the time-controlled release mechanism. The latching assembly is somewhat similar to that shown in FIGURE 10. Thus the same latch finger 111, pivots 112 and 115, springs 116, 118, and 122, and anchor bracket 117 are used. Lever 114 is modified as shown by 126 in FIGURE 11. As in the case of lever 114, lever 126 also has an extension 113 at its pivoted end; but at the free end a striking surface in the form of a flat plate of metal 127 is provided. A pin 128 extending from the surface of plate 123 engages the upper edge of lever 126 to keep it in the "closed" position, as shown.

The tripping mechanism is operated by a mechanical timer 129 supported by bracket 130 behind plate 123. The timer is a commercially available device having a conventional clock dial in front (not shown), and a winding stem 131, setting knob 132, and alarm "on-off" button 133 in the rear. The internal alarm mechanism is connected to an external stub shaft 134 that protrudes from the rear of the clock. For the purpose of this invention a collar 135, having a stop bar 136, is coupled to stub shaft 134 in any suitable manner, as by means of cotter pin 137.

The tripping mechanism comprises a lever 138 pivoted behind plate 123 on pin 139 and hammer arm 140 having a striking head 141 at its upper end. Arm 140 is pivoted on the front of plate 123 by means of pivot 142 at a point intermediate its upper and lower end. A tension spring 143, connected to plate 123 and arm 140 normally urges the arm downward (in a clockwise direction as shown). Lever 138 carries a small rod 144 at its lower end. Rod 144 is long enuogh to extend forward under plate 123 at right angles to lever 138 to engage the upper edge of arm 140. Thus, when the tripping mechanism is set, rod 144 bears on arm 140 which is prevented from rotating downward by the fact that the upper end of lever 138 rests on bar 136 connected to the alarm mechanism of the clock.

When the alarm goes off at a predetermined time, bar 136 rotates out from under lever 138 and removes the restraint on arm 140. Spring 143 is strong enough to cause hammer head 141 to strike a blow on plate 127 with sufficient force to release latch finger 111 and allow the gate to open. A pin 145 on plate 123 limits the rotation of arm 126 to an angle sufficient to permit extension 113 to release the latch.

In the modification just described, the clock release mechanism must be reset after each irrigation.

What is claimed is:
1. A gate for controlling the flow of liquid in an open ditch comprising:
  (a) a gate member rotable about a horizontal axis located above the center of gravity of said member, said gate member being in a substantially vertical position when closed and having an opening extending below the level of a liquid backed up behind said gate when closed;
  (b) latch means on the gate to maintain said gate in a closed position;
  (c) a vertically adjustable cover over the opening in the gate member to permit overflow of liquid above a predetermined depth;
  (d) an open-top receptacle mounted on the downstream side of the gate member for collecting liquid overflowing through the opening in the gate member;
  (e) a first elongated arm rotatably mounted on the downstream side of the gate member and having one end extending over the open top of the receptacle;
  (f) a first float connected to said end of the first elongated arm and extending downward into said receptacle;
  (g) means connecting the elongated arm to the latch means to release said latch means when a predetermined amount of liquid has overflowed into the receptacle and has caused the first float to rise;
  (h) a second float secured to the upstream side of the gate member near the lower end thereof to cause said gate member to rotate upward when the latch is released;
  (i) an elongated support member rigidly secured by one end to the gate member and extending above the center of gravity thereof when said gate member is in a closed position;
  (j) a second elongated arm rotatably mounted at a point intermediate its ends on said support member at a point above the center of gravity of the gate member;
  (k) pivot means for rotatably mounting said second elongated arm on said support member;
  (l) tension means connecting one end of said second elongated arm with a point on said support member below the pivot means;

(m) a counterweight rotatably mounted for rotation about a horizontal axis at the other end of said second elongated arm; and (n) a pair of stop means on said support member for restricting the angle through which said second elongated arm can rotate, said stop means being so located as to permit rotation of said second elongated arm and counterweight from a position overhanging the downstream side of the gate to urge the gate closed, past a position of alignment of said support member with said second elongated arm, to a position overhanging the upstream side of the gate to assist the second float to urge the gate toward a completely open position.

2. The gate of claim 1 in combination with
(a) an open-top ditch for conducting liquid;
(b) means on said ditch for mounting the gate for rotation about a horizontal axis transverse to said ditch; and
(c) means on said ditch for engaging the latch on the gate for maintaining the gate in a closed position.

3. In combination with an open-top ditch for conducting liquid:
(a) a gate rotatable about a horizontal axis located above its center of gravity, said gate being in a substantially vertical position when closed;
(b) means on the ditch for rotatably mounting the gate with its horizontal axis transverse to said ditch;
(c) latch means on said ditch;
(d) means on the gate for engaging the latch means to maintain said gate in a closed position;
(e) solenoid means connected to the latch means for releasing said latch means upon receipt by said solenoid of an energizing signal;
(f) a float secured to the upstream side of the gate near the lower end thereof to cause said gate to rotate upward when the latch means is released;
(g) an elongated support member rigidly secured by one end to the gate and extending above the center of gravity thereof when said gate is in a closed position;
(h) an elongated arm rotatably mounted at a point intermediate its ends on said support member at a point above the center of gravity of the gate;
(i) pivot means for rotatably mounting the elongated arm on the support member;
(j) tension means connecting one end of the elongated arm with a point on the support member below the pivot means;
(k) a counterweight rotatably mounted for rotation about a horizontal axis at the other end of the elongated arm; and
(l) a pair of stop means on the support member for restricting the angle through which the elongated arm can rotate, said stop means being so located as to permit rotation of said elongated arm and counterweight from a position overhanging the downstream side of the gate to urge the gate closed, past a position of alignment of the support member with the elongated arm, to a position overhanging the upstream side of the gate to assist the float to urge the gate toward a completely open position.

4. In combination with an open-top ditch for conducting liquid:
(a) a gate rotatable about a horizontal axis located above its center of gravity, said gate being in a substantially vertical position when closed;
(b) means on the ditch for rotatably mounting the gate with its horizontal axis transverse to said ditch;
(c) latch means on said ditch;
(d) means on the gate for engaging the latch means to maintain said gate in a closed position;
(e) latch-release means on the ditch for releasing the latch means at a predetermined time;
(f) adjustable time-controlled means connected to the latch-release means for actuating said latch-release means at a predetermined time;
(g) a float secured to the upstream side of the gate near the lower end thereof to cause said gate to rotate upward when the latch means is released;
(h) an elongated support member rigidly secured by one end to the gate and extending above the center of gravity thereof when said gate is in a closed position;
(i) an elongated arm rotatably mounted at a point intermediate its ends on said support member at a point above the center of gravity of the gate;
(j) pivot means for rotatably mounting the elongated arm on the support member;
(k) tension means connecting one end of the elongated arm with a point below the pivot means;
(l) a counterweight rotatably mounted for rotation about a horizontal axis at the other end of the elongated arm; and
(m) a pair of stop means on the support member for restricting the angle through which the elongated arm can rotate, said stop means being so located as to permit rotation of said elongated arm and counterweight from a position overhanging the downstream side of the gate to urge the gate closed, past a position of alignment of the support member with the elongated arm, to a position overhanging the upstream side of the gate to assist the float to urge the gate toward a completely open position.

References Cited by the Examiner
UNITED STATES PATENTS

| | | | |
|---|---|---|---|
| 329,728 | 11/1885 | Galloway | 61—25 |
| 487,961 | 12/1892 | Norton | 61—25 |
| 614,675 | 11/1898 | Tilton | 61—25 |
| 1,599,333 | 9/1926 | Kimball | 61—25 |
| 2,680,351 | 6/1954 | Jaramillo | 61—29 X |
| 3,208,225 | 9/1965 | Humpherys | 61—25 |
| 3,217,497 | 11/1965 | Humpherys et al. | 61—25 |

EARL J. WITMER, *Primary Examiner.*